United States Patent Office 3,496,144
Patented Feb. 17, 1970

3,496,144
PRODUCTION OF HYDROLYSIS-RESISTANT POLYURETHANE ELASTOMERS BASED ON ADIPIC ACID; 1,6-HEXANEDIOL; 2,2,4-TRIMETHYL-1,3-PENTANEDIOL POLYESTERS
Joachim Kunde, Frankenthal, Pfalz, and Hans Wilhelm and Helmut Doerfel, Ludwigshafen (Rhine), and Konrad Rauch, Limburgerhof, Pfalz, Germany, assignors to Badische Anilin- & Soda-Fabrik Aktiengesellschaft, Ludwigshafen am Rhine, Germany
No Drawing. Filed Nov. 29, 1966, Ser. No. 597,533
Claims priority, application Germany, Dec. 4, 1965, 1,264,047
Int. Cl. C08g 22/10
U.S. Cl. 260—75                                    3 Claims

ABSTRACT OF THE DISCLOSURE

An improved process for the production of shaped articles from hydrolysis-resistant elastomers containing urethane groups and optionally urea groups or semicarbazide groups in which substantially linear polyesters prepared from adipic acid and a mixture of 1,6-hexanediol and 2,2,4-trimethyl-1,3-pentanediol are reacted with an organic diisocyanate and then with chain extenders, in the presence or absence of inert polar solvents, followed by spinning or film-casting, with or without the removal of solvent.

---

This invention relates to a process for the production of moldings of elastomers containing urethane groups and/or urea groups and/or semicarbazide groups, in which a polyester derived from adipic acid and a mixture of 1,6-hexanediol and 2,2,4-trimethyl-1,3-pentanediol is reacted with a polyisocyanate and then with a chain extending agent.

It is known that elastomers containing urethane groups can be prepared by reacting polyethers or polyesters having terminal hydroxyl groups with diisocyanates and bringing the resultant prepolymers, which bear isocyanato end groups, into reaction with approximately stoichiometric amounts of a chain extender. The bifunctional chain extender may be used in the presence or absence of polar solvents.

Examples of chain extenders are diamines, hydrazine, dihydrazides and diols. The elastomers thus obtained are used for the production of moldings for industrial purposes, and of films, tapes and fibers.

Preferred compounds having terminal hydroxyl groups for the production of fibers are particularly polyethers, for example the polyether of tetrahydrofuran, because products which are particularly resistant to hydrolysis are thus obtained. Resistance to hydroylsis plays a major part in the case of textile fibers because they come into contact with alkaline substances during washing. However, it is not only fastness to washing which is important, but also a number of other properties, such as strength, elongation, resilience and particularly resistance to light and oxidation. Since these properties are dependent on the type of base uints, it is possible in many cases to achieve good results by suitable choice of the monomer components. Nevertheless it is not possible to combine all optimum properties in one product. Thus a fiber based on polytetrahydrofuran which is very fast to washing has the great disadvantage that it is very susceptible to the action of light and oxidizing agents. The defective resistance is due not only to the proportion of high melting point segment which is formed from diisocyanates and chain extender and which contains urethane groups and urea groups, but especially to the fact that the ether groups of the low melting point segment are susceptible in a high degree to the action of light and oxygen.

Since the resistance to light and oxidation in the case of fibers is so important a property, attempts have been made to replace the polyether fraction by a polyester fraction. The use of polyesters however generally results in a lower resistance to hydrolytic degradation. Examples of polyester components that have been used are the condensation products of conventionally used dicarboxylic acids and diols, such as adipic acid and ethylene glycol, 1,4-butanediol and propylene glycol-1,2, and also other aliphatic diols and dicarboxylic acids, such as suberic acid, azelaic acid or sebacic acid. All elastic polyurethanes which are built up in this way are particularly strongly attacked by the chemical reagents, especially alkalies, conventionally used in laundries, depending on the duration of their action; products treated in this way quickly lose their strength. Strong alkalies may completely destroy the polymers.

A certain advance has been achieved by the use of diols having longer chains, for example 1,6-hexanediol or decanediol-1,10, because elastomers prepared therewith are more resistant to hydrolysis, but the greater tendency to crystallization of these polymer segments at low temperatures adversely affects the elastic properties.

Finally it is known that the tendency for elastomeric products to crystallize may be lessened by incorporating in their polyester segment branched alcohols, particularly 2,2-dimethyl-1,3-propanediol or 2,3-butanediol. Better elasticity is combined with increased resistance to hydrolysis in this way.

The present invention has for its object to provide a process for the production of elastomers which are very resistant to hydrolysis.

Another object of the invention is to prepare elastomers which have better elastic properties at low temperatures.

A further object of the invention is to prpare elastomers having improved resistance to the action of light and oxidizing agents.

The invention therefore relates to an improved process for the production of moldings from elastomers containing urethane groups and/or urea groups and/or semicarbazide groups, which can be obtained by reacting polyesters having a molecular weight of from 500 to 5000 (prepared from adipic acid and a mixture of diols) with polyisocyanates and then with chain extenders, in the presence or absence of inert polar solvents followed by molding, with or without the removal of solvent.

The improvement consists in using, as the polyester containing at least two hydroxyl groups, one which has been prepared by a conventional method from adipic acid and a mixture of diols consistsing of 45 to 90% by weight of 1,6-hexanediol and 10 to 55% by weight of 2,2,4-trimethyl-1,3-pentanediol.

As compared with the prior art elastic fibers based on polyesters, polyisocyanates and chain extenders, the new fibers have outstanding resistance to alkali, and therefore to washing, in addition to surprisingly good elasticity at low temperatures. Since the polymers do not contain any ether bonds, the usual susceptibility to the action of light and oxidation otherwise caused by these groupings is absent.

Polyesters used according to this invention should have a molecular weight of 500 to 5000, preferably 1500 to 2500. In addition to adipic acid, up to 10% of other dicarboxylic acids on the weight of adipic acid may be incorporated into the polyesters. Examples are aliphatic dicarboxylic acids, such as sebacic acid, suberic acid and azelaic acid. The polyesters should contain, with reference to the total diol mixture, at least 45% and not more than 90% by weight of 1,6-hexanediol and at least 10% and not more than 55% by weight of 2,2,4-trimethyl-1,3-pentanediol. Polyesters which contain at least 60% and not more than 83% by weight of 1,6-hexanediol units and at least 17% and not more than 40% by weight of 2,2,4-trimethyl-1,3-pentanediol units are particularly advantageous. The 2,2,4-trimethyl-1,3-pentanediol may be replaced to some extent by 2,2-dimethyl-1,3-hexanediol. This proportion (on the pentanediol) should not exceed 50% by weight. Production of the polyester does not form the subject of the present invention and it may be carried out by conventional methods.

The elastomers containing urethane groups may be prepared in conventional manner, the polyesters to be used according to this invention being reacted with an excess of diisocyanate and then with chain extenders. Examples of conventional diisocyanates are diphenylmethane-4,4'-diisocyanate, toluylene-2,4-diisocyanate, p-phenylene-2,6-diisocyanate, naphthylene-1,5-diisocyanate, hexane-1,6 - diisocyanate or diisocyanates which have been prepared by partial or complete hydrogenation of the abovementioned aromatic compounds. In special cases it is advantageous to use 4,4'-diisocyanato diphenyl ether or 4,4'-diisocyanato diphenyl thioether.

Examples of diamines suitable for chain extension are ethylene diamine, propylene diamine, m-xylylene diamine and also hydrazine or dihydrazides, such as carbodihydrazide or adipodihydrazide. Reaction with particularly reactive chain extenders such as diamines, hydrazine and hydrazides is advantageously carried out in inert polar solvents such as dimethylformamide, dimethylacetamide, tetramethylurea or dimethyl sulfoxide, and these solvents may be diluted with less polar solvents. Examples of suitable glycols are ethylene glycol and 1,4-butanediol.

These new elastomers, which are suitable for spinning into fibers, combine a number of properties which makes it possible to prepare fibers which may be used not merely for special purposes but over a wide field. They may be used where there are stringent requirements as to resistance to light and oxidation. On the other hand they satisfy all requirements as regards resistance to washing.

Fibers prepared in accordance with this invention are suitable for preparing textiles for a great variety of industrial outlets and for clothing.

The invention is illustrated by the following examples in which the parts specified are parts by weight.

Example 1

(a) Production of the polyester.—1875 parts of adipic acid, 1363 parts of 1,6-hexanediol and 421 parts of 2,2,4-trimethyl-1,3-pentanediol (ratio of the diols by weight: 76.4:23.6) are esterified by raising the temperature to 200° C. while removing the water of reaction with 120 parts of benzene as entrainer. Toward the end, the esterification is completed at subatmospheric pressure, for example from 1 to 20 mm. Hg, the remainder of the entrainer being removed at the same time. A copolymer is obtained having the following properties:

Acid number _____ 1.3
Hydroxyl number _____ 49
Melting point _____° C__ 41

(b) Production of the polymer.—2000 parts of the above polyester is stirred for two hours at 100° C. with 500 parts of 4,4'-diphenylmethane diisocyanate while excluding moisture, the reactor being purged with nitrogen. The whole is cooled, the isocyanate content then being 3.41%. It is diluted with 6430 parts of purified dimethylformamide and a solution of 78 parts of ethylene diamine hydrate in 2145 parts of dimethylfomamide is added at room temperature with vigorous stirring. The viscosity thus increases considerably. In a 23% solution, after completion of the reaction of the components, the viscosity is 440 poises at 25° C.

(c) Spinning the solution.—The solution obtained according to 1(b) is spun on conventional dry-spinning equipment with a feed rate of 14 g./minute through a six-orifice jet having a diameter of 0.2 mm. with a take-up speed of 260 m./minute and a temperature of 200° C. in the shaft. Highly elastic filaments having the following properties are obtained:

Denier _____ 127
Elongation _____percent__ 627
Tensile strength:
  With reference to the original cross-section
  _____g./den__ 0.842
  With reference to the cross-section at break
  _____g./den__ 6.12
  Load at 200% elongation _____g./den__ 0.098
  Load at 400% elongation _____g./den__ 0.276

The elastomer exhibits a remarkable resistance to hydrolysis. After treatment for twenty-four hours with 10% caustic soda solution at 40° C., the filaments still have more than 85% of the original strength. A sample having a similar composition but having a polyester component from adipic acid and ethylene glycol and propylene glycol disintegrates under the same test.

Example 2

(a) Production of the polyester.—1780 parts of adipic acid, 1436 parts of 1,6-hexanediol and 222 parts of 2,2,4-trimethyl-1,3-pentanediol (ratio by weight of the diols: 86.6:13.4) are esterified as specified under 1(a). A polyester is obtained which has the following properties:

Acid number _____ 1.4
Hydroxyl number _____ 51
Melting point _____° C__ 48

(b) Production of the polymer.—1000 parts of the copolyester 2(a) is reacted with 250 parts of 4,4'-diphenylmethane diisocyanate for two hours at 100° C. to form an adduct whose isocyanate content after it has been cooled to room temperature is 3.70%. It is diluted with 3215 parts of purified dimethylformamide and while stirring intensely a solution of 43 parts of ethylene diamine hydrate in 1072 parts of dimethylformamide is added.

(c) Casting film.—The highly viscous polymer solution thus formed is poured in a layer 3 mm. in thickness onto a sheet of glass and the solvent is evaporated at elevated temperature. Highly elastic films having very good resistance to hydrolytic degradation are obtained.

Tensile strength _____kg./sq.cm__ 655
Elongation _____percent__ 622

We claim:
1. Shaped articles from elastomers containing urethane groups prepared by the process of reacting:
  (1) a substantially linear polyester having at least two hydroxyl groups and a molecular weight of from 500 to 5000, said polyester being prepared by reacting adipic acid and a diol mixture of from 45 to 90% by weight of 1,6-hexanediol and from 10 to 55% by weight of 2,2,4-trimethyl-1,3-pentane diol with
  (2) an organic diisocyanate and then with
  (3) a chain extender selected from the group consisting of diamines, hydrazine, hydrazides and diols, followed by spinning or film-casting.

2. The shaped articles of claim 1 wherein the amount of said 1,6-hexanediol in said diol mixture is from 60–83% by weight and the amount of said 2,2,4-trimethyl-1,3-pentanediol is from 17–40% by weight.

3. A solution of the elastomers containing urethane groups of claim 1.

References Cited

UNITED STATES PATENTS

| | | | |
|---|---|---|---|
| 2,929,800 | 3/1960 | Hill | 260—77.5 |
| 3,071,557 | 1/1963 | Frazer et al. | 260—32.6 |
| 3,165,566 | 1/1965 | Murphy et al. | 264—184 |
| 3,202,636 | 8/1965 | Windemuth et al. | 260—75 |
| 3,379,683 | 4/1968 | Booth | 260—47 |

FOREIGN PATENTS

| | | |
|---|---|---|
| 917,450 | 2/1963 | Great Britain. |
| 947,840 | 1/1964 | Great Britain. |

DONALD E. CZAJA, Primary Examiner

H. S. COCKERAM, Assistant Examiner

U.S. Cl. X.R.

260—30.8, 32.4, 32.6, 77.5